United States Patent Office 3,635,963
Patented Jan. 18, 1972

3,635,963
6,13-CYANO, NITRO, OR ARYLSULPHONYL TRIPHENODIOXAZINE DYESTUFFS
Stefan Hari, Basel, and Karl Ronco, Riehen, Switzerland, assignors to Ciba Limited, Basel, Switzerland
No Drawing. Filed June 10, 1969, Ser. No. 832,023
Claims priority, application Switzerland, June 12, 1968, 8,709/68
Int. Cl. C07d 87/48
U.S. Cl. 260—246     6 Claims

ABSTRACT OF THE DISCLOSURE

Dioxazines of the formula

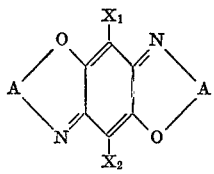

in which A represents an ortho-arylene radical, $X_1$ represents a cyano, nitro or arylsulphonyl group, and $X_2$ represents a cyano, nitro or arylsulphonyl group or a hydrogen or halogen atom, are valuable pigments useful for coloring plastic masses in fast shades.

---

The present invention provides dioxazines of the formula

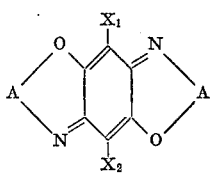

in which A represents an ortho-arylene residue, $X_1$ represents a cyano, nitro, or arylsulphonyl group and $X_2$ represents a hydrogen or halogen atom, or a cyano, nitro or arylsulphonyl group.

The present invention also provides a process for preparing dyestuffs of the above-mentioned formula, which comprises subjecting a 3,6-bis-arylamino-benzoquinone of the formula

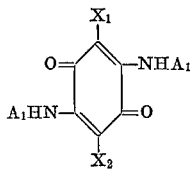

in which $X_1$ and $X_2$ have the meaning given above, and $A_1$ represents an aryl residue that contains an ether group in ortho-position to the imino group, to a ring closure operation leading to the formation of dioxazines.

The 3,6-bis-arylamino-1,4-benzoquinones used as starting materials preferably correspond to the formula

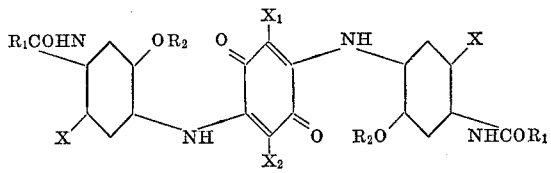

in which $R_1$ represents a hydrogen atom or an alkyl, aralkyl, aryl or heterocyclic residue, $R_2$ represents an alkyl or aryl residue, and X represents a halogen atom or an alkyl, alkoxy, or aryloxy group, and $X_1$ and $X_2$ have the meaning given above.

The 3,6-bis-arylamino-1,4-benzoquinones are advantageously obtained by condensing 1 mole of a 2,5-dihalogenbenzoquinone of the formula

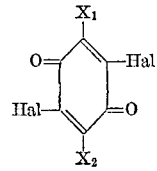

with 2 mols of an arylamine that contains an ether group advantageously in ortho-position to the imino group, especially an ortho-alkoxy or ortho-phenoxy-aminobenzene.

As examples there may be mentioned the following arylamines 1-amino-2,5-dimethoxy-4-formylaminobenzene,
1-amino-2,5-dimethoxy-4-acetylaminobenzene,
1-amino-2,5-dimethoxy-4-propionylaminobenzene,
1-amino-2,5-dimethoxy-4-benzoylaminobenzene,
1-amino-2,5-dimethoxy-4-(ortho-chlorobenzoylamino)-benzene,
1-amino-2,5-dimethoxy-4-(para-chlorobenzoylamino)-benzene,
1-amino-2,5-dimethoxy-4-(2'-thienylamino)-benzene,
1-amino-2,5-dimethoxy-4-(2'-furoylamino)-benzene,
1-amino-2,5-diethoxy-4-formylaminobenzene,
1-amino-2,5-diethoxy-4-acetylaminobenzene,
1-amino-2,5-diethoxy-4-benzoylaminobenzene,
1-amino-2,5-diethoxy-4-(ortho-chlorbenzoylamino)-benzene,
1-amino-2,5-diethoxy-4-(para-chlorobenzoylamino)-benzene,
1-amino-2,5-diethoxy-4-(2'-4'-dichlorobenzoylamino)-benzene,
1-amino-2,5-diethoxy-4-(ortho-methylbenzoylamino)-benzene,
1-amino-2,5-diethoxy-4-(meta-methylbenzoylamino)-benzene,
1-amino-2,5-diethoxy-4-(para-methylbenzoylamino)-benzene,
1-amino-2,5-diethoxy-4-(ortho-methoxybenzoylamino)-benzene,
1-amino-2,5-diethoxy-4-(meta-methoxybenzoylamino)-benzene,
1-amino-2,5-diethoxy-4-(para-methoxybenzoylamino)-benzene,
1-amino-2,5-diethoxy-4-(para-phenylbenzoylamino)-benzene,
1-amino-2,5-diethoxy-4-(para-carbomethoxybenzoyl amino)-benzene,
1-amino-2,5-diethoxy-4-(3'-pyridine-carbonylamino)-benzene,
1-amino-2,5-diethoxy-4-(2'-furoylamino)-benzene,
1-amino-2,5-diethoxy-4-(2'-thienoylamino)-benzene,
1-amino-2,5-diethoxy-4-(5'-carbomethoxy-2'-thienoylamino)-benzene,
1-amino-2,5-diphenoxy-4-benzoylaminobenzene,
1-amino-2-methoxy-5-chloro-4-acetylaminobenzene,
1-amino-2-methoxy-5-chloro-4-benzoylaminobenzene,
1-amino-2-methoxy-5-chloro-4-(para-chlorobenzoyl amino)-benzene,
1-amino-2-ethoxy-5-chloro-4-acetylaminobenzene,
1-amino-2-ethoxy-5-chloro-4-benzoylaminobenzene,
1-amino-2-ethoxy-5-chloro-4-(para-methylbenzoylamino)-benzene,
1-amino-2-ethoxy-5-methyl-4-acetylaminobenzene,
1-amino-2-ethoxy-5-methyl-4-benzoylaminobenzene,
1-amino-2-ethoxy-5-methyl-4-(para-chlorbenzoylamino)-benzene, 1-amino-2-methoxynaphthalene,
2-amino-1-methoxynaphthalene,
1-amino-2,4-diethoxy-5-chlorobenzene.

The dioxazine ring closure is advantageously carried out at a temperature within the range of from 150° C. to 210° C. in an inert organic solvent, for example, ortho-dichloro-benzene, trichlorobenzene, nitrobenzene, naphthalene or chloronaphthalene, and preferably in the presence of an acid halide, for example, benzoyl chloride, para-toluene sulphonic acid chloride or thionyl chloride.

When a 2,5-dinitro- or 2,5-diarylsulphonyl-3,6-bis-arylamino-1,4-benzoquinone is used as a starting material and the ring closure is carried out in the presence of an acid halide, one of the two nitro or arylsulphonyl groups is replaced by a halogen atom.

The products so obtained are valuable red to blue dyestuffs which are suitable primarily as pigments and are useful for a very wide variety of pigment applications, for example, in a finely dispersed form for dyeing artificial silk and viscose or cellulose ethers or esters or polyamides, polyurethanes or polyesters in the spinning composition, and also for the manufacture of coloured lacquers or lacquer formers, solutions and products of acetyl-cellulose, nitrocellulose, natural or synthetic resins, for example, polymerisation resins or condensation resins, for example, aminoplasts, alkyd resins, phenoplasts, or polyolefines, for example, polystyrene, polyvinyl chloride, polyethylene, polypropylene, polyacrylonitrile, rubber, casein, silicone or silicone resins. They can also be used for the manufacture of dyestuffs or laminated plates.

As compared with the comparable dyestuffs described in DAS 1,231,370, which contain carbalkoxy groups in the 9,10-position, the dyestuffs of the invention have the advantage of a better fastness to light and to migration.

The following examples illustrate the invention, the parts and percentages being by weight unless otherwise stated, and the relationship of parts by weight to parts by volume being the same as that of the kilogram to the litre.

EXAMPLE 1

2.4 parts of 2,5-dicyano-3,6-dibromo-benzoquinone (obtained according to German specification No. 1,238,894 by the oxidation of 2,5-dicyano-2,6-dibromo-hydroquinone with nitrous gases), 4.5 parts of 1-amino-4-benzoylamino-2,5-diethoxy-benzene and 3,4 parts of anhydrous sodium acetate are stirred in 50 parts by volume of ortho-dichlorobenzene for 30 minutes at 180° C. The resulting 2,5-dicyano-3,6-di-(2',5'-diethoxy - 4' - benzoylamino-phenylamino)-benzoquinone is filtered off at 120° C., and then washed with alcohol and water and dried, to give a dull red powder that melts above 320° C. It dyes polyvinyl chloride red-brown tints of good fastness to light and excellent fastness to migration.

Analysis.—Calculated (percent): C, 66.80; H, 5.08; N, 11.15. Found (percent): C, 66.66; H, 5.13; N, 11.12.

2.5 parts of this product in 35 parts by volume of ortho-dichlorobenzene are mixed with 4.0 parts of benzoyl chloride, and the whole is stirred for 40 hours at 175 to 180° C. The pigment so obtained is filtered off with suction at 120° C., and washed first with hot ortho-dichlorobenzene and then with cold methanol and finally with hot water, and is dried. A blue-black crystalline powder is obtained, which corresponds to the formula

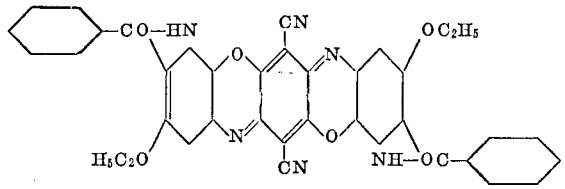

Analysis.—Calculated (percent): C, 68.87; H, 3.96; N, 12.68. Found (percent): C, 68.43; H, 3.83; N, 12.44.

The new dyestuff dyes polyvinyl chloride blue tints of very good fastness to light and migration.

In the following table there are given further dioxazine dyestuffs, which are obtained by the process described in Example 1 by subjecting to ring closure the condensation product of the formula

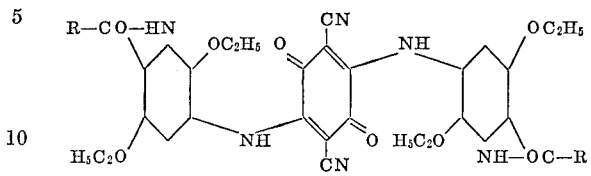

obtained by condensing 2,5-dicyano-3,6-dibromo-benzoquinone with the appropriate aminobenzene in the molar ratio of 1:2.

| Number | R | Reaction (ring closure) time in hours | Tint in PVC |
|---|---|---|---|
| 1 | 4-methoxyphenyl | 4.5 | Blue. |
| 2 | 3-methoxyphenyl | 9.5 | Do. |
| 3 | 2-methoxyphenyl | 2.5 | Grey-blue. |

EXAMPLE 2

3.2 parts of 2,5-dicyano-3,6-dibromo-benzoquinone, 7.1 parts of 1-amino-4(2'-chloro-benzoylamino)-2,5-diethoxy-benzene and 1.7 parts of anhydrous sodium acetate are stirred in 100 parts by volume of isopropanol for 4 hours at 83° C. The resulting product is filtered off at room temperature, washed with alcohol and water, and dried to give a dark violet powder.

4.1 parts of this product in 40 parts by volume of ortho-dichlorobenzene are mixed with 2.8 parts of benzoyl chloride and the whole is stirred for 10 hours at 175° to 180° C. The product so obtained is filtered off with suction at 120° C., washed first with hot ortho-dichlorobenzene, then with cold methanol and finally with hot water, and dried. A black powder is obtained which corresponds to the formula

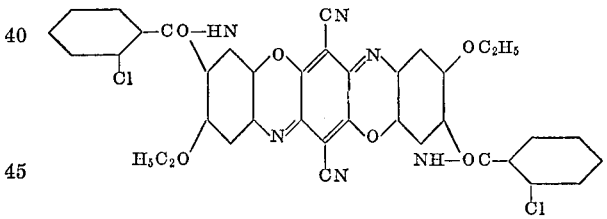

It dyes polyvinyl chloride fast violettish blue tints. Instead of benzoyl chloride there may be used in this reaction with equal success other carboxylic acid chlorides, for example, acetyl chloride and 4-phenyl-benzoyl chloride, or inorganic ring closing agents, for example, thionyl chloride and phosphorus pentachloride (optionally in the presence of dimethyl-formamide).

In the following table are given further dioxazine dyestuffs that are obtainable by subjecting to ring closure the condensation product of the formula

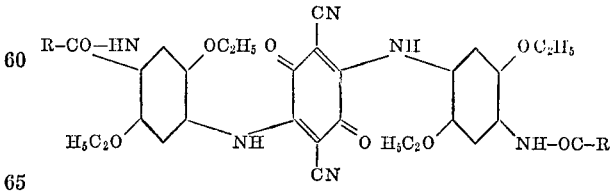

obtained by condensing 2,5-dicyano-3,6-dibromo-benzoquinone with the appropriate aminobenzene in the molar ratio 1:2.

| Number | R | Reaction (ring closure) time in hours | Tint in PVC |
|---|---|---|---|
| 1 | 4-tolyl | 3 | Blue. |
| 2 | 3-tolyl | 2.5 | Violettish blue. |
| 3 | 2-tolyl | 2 | Do |

EXAMPLE 3

2.4 parts of 2,5-dicyano-3,6-dibromo-benzoquinone, 5.5 parts of 1-amino-4-(2',4'-dichlorobenzoylamine)-2,5-diethoxy-benzene and 2.4 parts of anhydrous sodium acetate in 50 parts by volume of α-chloro-naphthalene are heated up to 205° C. during 50 minutes and stirred at that temperature for 30 minutes. The resulting pigment is filtered off with suction at 130° C., washed first with hot ortho-dichlorobenzene, then with cold methanol and finally with hot water, and dried. It is a red-violet powder and corresponds to the formula

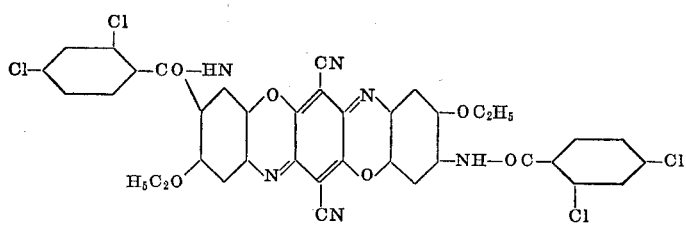

and, when brought into fine dispersion, dyes polyvinyl chloride violet tints of very good fastness to light and migration.

EXAMPLE 4

2.3 parts of 2-nitro-3,6-dibromo-benzoquinone, 5.0 parts of 1-amino-4-(3'-chloro-benzoylamine)-2,5-diethoxybenzene and 2.4 parts of anhydrous sodium acetate in 50 parts by volume of α-chloro-naphthalene are heated up to 205° C. during 50 minutes and stirred at that temperature for 30 minutes. The pigment so obtained its worked up in a manner analogous to that described in Example 3. It is a green crystalline powder and corresponds to the formula

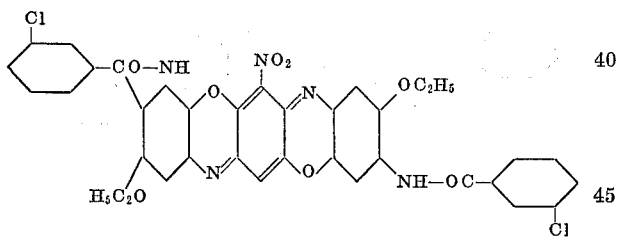

*Analysis.*—Calculated (percent): C, 59.52; H, 3.47; N, 9.64; Cl, 9.7. Found (percent): C, 59.1; H, 3.4; N, 9.4; Cl, 9.9.

The new dyestuff dyes polyvinyl chloride violet tints of good fastness to light and migration.

In the following table are given further dioxazine dyestuffs which are obtained by subjecting to ring closure the dianil of the formula

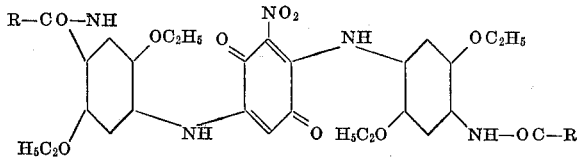

in which R has the meaning given in column 1, and obtained by the process described in Example 4.

| Number | R | Tint in PVC |
|---|---|---|
| 1 | 2-chlorophenyl | Violet. |
| 2 | Phenyl | Grey-violet. |
| 3 | 4-tolyl | Blue-violet. |
| 4 | 4-chlorophenyl | Grey-violet. |

The 2-nitro-3,6-dibromo-benzoquinone can be obtained as follows:

2.6 parts of 2,5-dibromo-hydroquinone diacetate are introduced in portions, while stirring and cooling with cold water, into 30 parts by volume of nitric acid of 100% strength. The resulting red-orange solution is allowed to stand for two days at room temperature. The flask is kept during this period in a water bath, as otherwise the reaction mixture would heat up spontaneously and the product would be decomposed. The red-orange solution is then poured on to 100 parts of ice. The yellow precipitate so formed is filtered off with suction, washed neutral with ice-cold water, kept in a vacuum desiccator for 6 hours, again washed with ice-cold water, and dried in a vacuum desiccator. The product is finally recrystallised from 135 parts by volume of hexane. The resulting 2-nitro-3,6-dibromo-benzoquinone is a yellow powder that melts at 127 to 129° C.

*Analysis.*—Calculated (percent): C, 23.2; H, 0.32; Br, 51.4; N, 4.5. Found (percent): C, 23.3; H, 0.4; Br, 52.2; N, 4.4.

EXAMPLE 5

2.9 parts of 2,5-dinitro-3,6-diethoxy-benzoquinone (obtained by etherifying nitranilic acid with ortho-formic acid triethyl ester), 7.1 parts of 1-amino-4-(2'-chlorobenzoylamino)-2,5-diethoxybenzene and 1.7 parts of anhydrous sodium acetate are stirred in 60 parts by volume of isopropanol for 4 hours at 83° C. The resulting product is filtered off at room temperature, washed with alcohol and water, and dried.

6.3 parts of the dianil are heated up to a temperature within the range of from 185° to 190° C. in 37 parts by volume of α-chloro-naphthalene and stirred at that temperature for 4 hours. The pigment so obtained is filtered off with suction at 120° C., washed with hot ortho-dichlorobenzene, cold methanol, and finally with hot water, and dried. The dyestuff of the formula

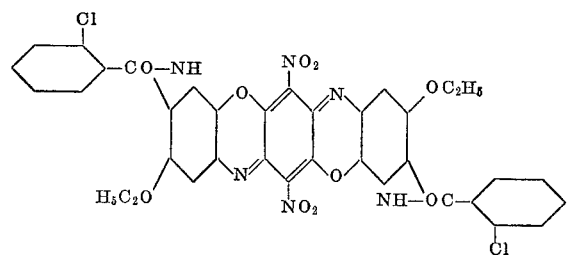

dyes polyvinyl chloride pure blue tints.

*Analysis.*—Calculated (percent): C, 56.0; H, 3.1; Cl, 9.2; N, 10.9. Found (percent): C, 56.2; H, 3.2; Cl, 9.8; N, 10.1.

There are also obtained pigments yielding blue tints by using in this Example, instead of 1-amino-4-(2'-chlorobenzoyl amino)-2,5-diethoxybenzene, amines of the general formula

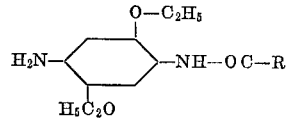

given in the following table, and in which Formula R has the meanings given in column 1 of the table.

| Number | R | Tint of pigment in PVC |
|---|---|---|
| 1 | Phenyl | Blue. |
| 2 | 3-chlorophenyl | Cobalt blue. |
| 3 | 4-chlorophenyl | Grey-blue. |

EXAMPLE 6

2.9 parts of 2,5-dinitro-3,6-diethoxybenzoquinone, 6.4 parts of 1-amino-4-benzoylamino - 2,5 - diethoxybenzene and 1.7 parts of anhydrous sodium acetate are stirred in 60 parts by volume of isopropanol for 4 hours at 83° C. The resulting product is filtered off at room temperature, washed with alcohol and water, and dried.

The same product is also obtained by using in this reaction, instead of 2,5-dinitro-3,6-diethoxy-benzoquinone, the equivalent quantity of 2,5-dinitro-3,6-diacetoxy-benzoquinone (deflagrates at 111° C.).

4.0 parts of the dianil in 35 parts by volume of ortho-dichlorobenzene are mixed with 4.2 parts of benzoyl chloride, and the whole is heated up to 178° C., and stirred at that temperature for 30 minutes. The pigment so obtained, which has the formula

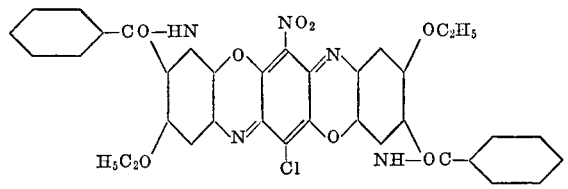

is filtered off with suction at 120° C. and purified as described in Example 5. It dyes polyvinyl chloride strongly coloured, fast, blue tints.

*Analysis.*—Calculated (percent): C, 62.4; H, 3.8; Cl, 5.1; N, 10.1. Found (percent): C, 6.10; H, 3.8; Cl, 6.2; N, 9.8.

If in the third paragraph 2,5-diphenylsulphonyl-3,6-di(2',5'-diethoxy - 4 - benzoylamino-phenylamino)-1,4-benzoquinone is used as starting material there is obtained the dyestuff of the formula

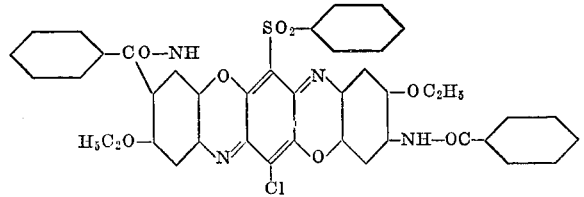

It dyes polyvinyl chloride blue tints.

*Analysis.*—Calculated (percent): C, 64.0; H, 3.97; Cl, 4.5; N, 7.1; S, 4.0. Found (percent): C, 64.2; H, 4.1; Cl, 4.7; N, 7.1; S, 4.0.

Instead of using benzoyl chloride for the ring-closing reaction there may be used with equal success benzoyl bromide or benzoyl fluoride. The corresponding bromine or fluorine containing dioxazine dyestuffs are obtained.

By using in the third paragraph the dianil of the formula

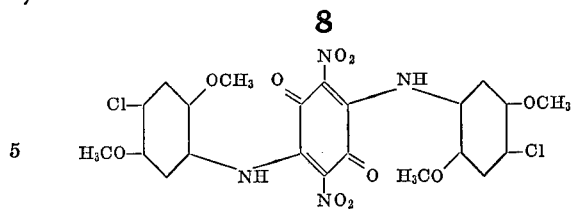

there is obtained the dioxazine dyestuff of the formula

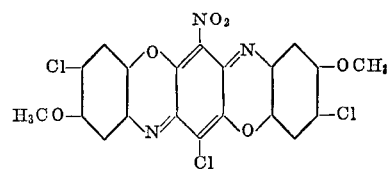

which dyes polyvinyl chloride red tints.

EXAMPLE 7

3.2 parts of 2,5-dicyano-3,6-dibromo-benzoquinone, 6.4 parts of 1-amino-2,4-di-(2'-methyl-phenoxy)-benzene and 1.7 parts of anhydrous sodium acetate in 45 parts by volume of ethanol are stirred for 4 hours at 80° C. The resulting product is filtered off at room temperature, washed with alcohol and water and dried to give an orange powder.

4.4 parts of this product in 20 parts by volume of ortho-dichlorobenzene are mixed with 1.7 parts of benzoyl chloride, and the whole is stirred for 24 hours at 182° to 184° C. The resulting pigment is filtered off with suction at 100° C. and washed with ortho-dichlorobenzene, then with methanol and finally with hot water, and dried. It is a reddish green crystalline powder and correspond to the formula

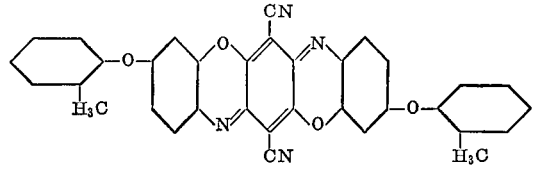

It dyes polyvinyl chloride fast reddish violet tints.

In the following table are given further dyestuffs which are obtained by subjecting to ring closure by the process described in Example 7 a dianil of the general formula

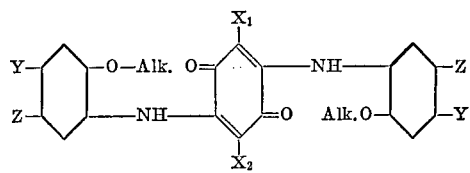

in which $X_1$, $X_2$, Y and Z have the meanings given in the table.

| Number | $X_1$ | $X_2$ | Y | Z | Tint in PVC |
|---|---|---|---|---|---|
| 1 | $NO_2$ | H | $O-C_6H_5$ | H | Grey-ruby. |
| 2 | $NO_2$ | $NO_2$ | $O-C_6H_5$ | H | Red-lilac. |
| 3 | $NO_2$ | $NO_2$ | $O-C_2H_5$ | H | Red. |
| 4 | $SO_2-C_6H_5$ | $SO_2-C_6H_5$ | H | $O-C_2H_5$ | Red. |
| 5 | $NO_2$ | H | O—⟨C₆H₄⟩—CH₃ | H | Orange-red. |
| 6 | $NO_2$ | H | $O-C_6H_5$ | $CF_3$ | Red-orange. |

EXAMPLE 8

2.9 parts of 2,5-dinitro-3,6-diethoxy-benzoquinone, 5.3 parts of 1-amino-2-methoxy-naphthalene (commercial) and 1.7 parts of anhydrous sodium acetate in 45 parts by volume of methanol are treated in a manner analogous to that described in Example 7. There is obtained a dark currant-coloured powder.

2.7 parts of this product in 18 parts by volume of α-chloro-naphthalene are heated up to 190° to 192° C., and stirred at that temperature for 2 hours. The new pigment is filtered off with suction at 130° C., washed with ortho-dichlorobenzene, then with methanol and finally with hot water, and dried. The dyestuff of the formula

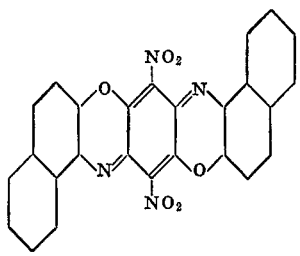

is a black powder and dyes polyvinyl chloride violettish blue tints.

By using in this example instead of 1-amino-2-methoxy-naphthalene-6-sulphonic acid, derivatives of 1-amino-2-methoxy-naphthalene-6-sulphonic acid, for example, 1-amino-2-methoxy-naphthalene-6-sulphonic acid amide, there are obtained pigment dyestuffs having similarly good tinctorial properties.

EXAMPLE 9

2.3 parts of 2,3-dicyano-5,6-dichloro-benzoquinone (DDQ), 6.4 parts of 1-amino-4-benzoylamino-2,5-diethoxybenzene and 1.7 parts of anhydrous sodium acetate in 70 parts by volume of isopropanol are stirred for 4 hours at 83° C. The resulting product is filtered off at room temperature, washed with alcohol and water, and dried.

5.2 parts of the dianil in 35 parts by volume of ortho-dichlorobenzene are mixed with 4.2 parts of benzoyl chloride, and the whole is heated up to 180° C. and stirred for one hour at that temperature. The resulting pigment of the formula

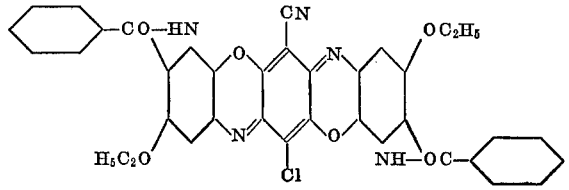

is filtered off with suction at 130° C. and purified as described in Example 5. It dyes polyvinyl chloride fast and strongly coloured violetish blue tints.

*Analysis.*—Calculated (percent): C, 66.1; H, 3.9; Cl, 5.3; N, 10.4. Found (percent): C, 65.7; H, 3.8; Cl, 5.3; N, 9.7.

What is claimed is:
1. A dioxazine of the formula

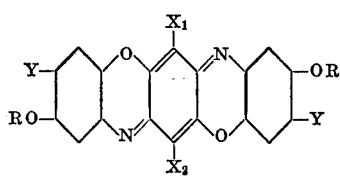

in which R is a phenyl, phenyl-lower alkyl or lower alkyl radical, $X_1$ a cyano, nitro or phenylsulphonyl group, $X_2$ a cyano, nitro or phenylsulphonyl group or a hydrogen or halogen atom, and Y a hydrogen or halogen atom or benzoylamino, optionally substituted with one or two halogen atoms, lower alkyl or lower alkoxy groups, or with one para-phenyl or one para-carbomethoxy group.

2. A dioxazine as claimed in claim 1 of the formula

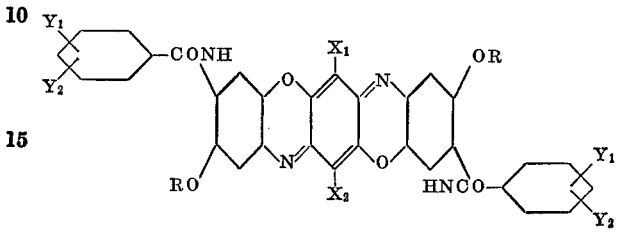

in which R, $X_1$ and $X_2$ have the meanings given in claim 2, $Y_1$ and $Y_2$ are hydrogen or halogen atoms, lower alkyl or lower alkoxy groups.

3. The compound of the formula

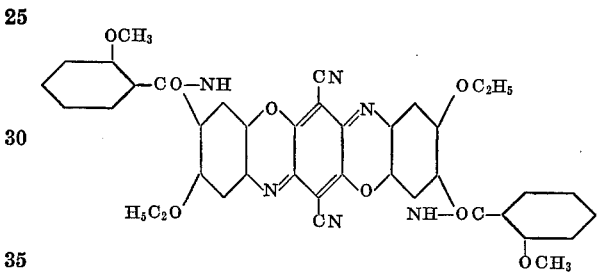

4. The compound of the formula

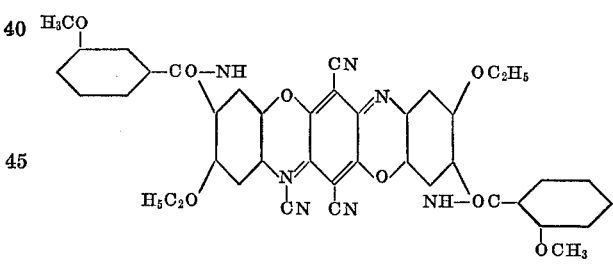

5. The compound of the formula

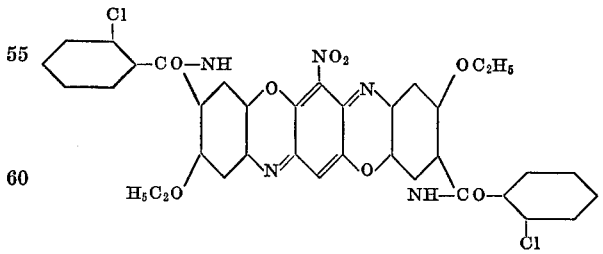

6. The compound of the formula

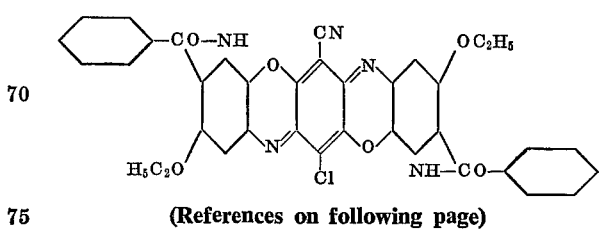

(References on following page)

References Cited

UNITED STATES PATENTS

| | | | |
|---|---|---|---|
| 2,948,721 | 8/1960 | Frey | 260—246 R |
| 3,009,913 | 11/1961 | Pugin et al. | 260—244 R |
| 3,022,298 | 2/1962 | Mory et al. | 260—244 R |
| 3,391,104 | 7/1968 | Harris et al. | 260—244 R |
| 3,523,117 | 8/1970 | Pugin et al. | 260—246 R |

HENRY R. JILES, Primary Examiner

S. D. WINTERS, Assistant Examiner

U.S. Cl. X.R.

8—3, 4, 5, 8, 54.2, 177 R, 178 R, 179, 180, 178 E, Dig 1, Dig 4 Dig 9; 106—193, 204; 260—37 R, 41 C, 764, 465 E, 576, 562 P, 558 R, 590, 465 G, 557 R, 332.3 R, 347.3, 471 R, 295 K

UNITED STATES PATENT OFFICE
CERTIFICATE OF CORRECTION

Patent No. 3,635,963          Dated January 18, 1972

Inventor(s) STEFAN HARI ET AL

It is certified that error appears in the above-identified patent and that said Letters Patent are hereby corrected as shown below:

Column 10, line 21, delete "2" and insert --- 1 ---;

claim 4, in the formula change

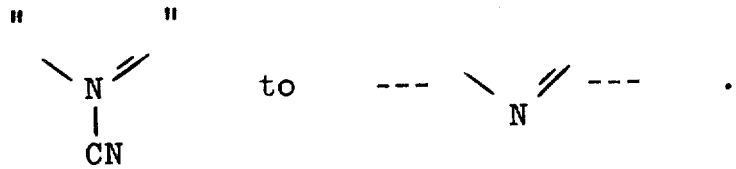

Signed and sealed this 4th day of July 1972.

(SEAL)
Attest:

EDWARD M. FLETCHER, JR.
Attesting Officer

ROBERT GOTTSCHALK
Commissioner of Patents